United States Patent
Kadlec et al.

(10) Patent No.: US 8,751,352 B2
(45) Date of Patent: Jun. 10, 2014

(54) RULES-BASED RISK MANAGEMENT

(75) Inventors: Charles W. Kadlec, Summit, NJ (US);
John Kurt Schonberg, Eagan, MN (US); Gary Alan Terpening, New York, NY (US)

(73) Assignee: Ameriprise Financial, Inc., Minneapolis, MN (US)

( * ) Notice: Subject to any disclaimer, the term of this patent is extended or adjusted under 35 U.S.C. 154(b) by 780 days.

(21) Appl. No.: 12/576,127

(22) Filed: Oct. 8, 2009

(65) Prior Publication Data
US 2011/0087615 A1  Apr. 14, 2011

(51) Int. Cl.
*G06Q 40/00* (2012.01)
*G06Q 40/06* (2012.01)
*G06Q 40/04* (2012.01)
*G06Q 30/02* (2012.01)

(52) U.S. Cl.
CPC .............. *G06Q 40/06* (2013.01); *G06Q 40/00* (2013.01); *G06Q 40/04* (2013.01); *G06Q 30/0201* (2013.01)
USPC .......................................... 705/36 R; 705/37

(58) Field of Classification Search
CPC ....... G06Q 40/00; G06Q 40/04; G06Q 40/06; G06Q 30/0201
USPC ................................. 705/36 R, 37
See application file for complete search history.

(56) References Cited

U.S. PATENT DOCUMENTS

| | | | |
|---|---|---|---|
| 6,061,663 A | 5/2000 | Bloom | |
| 6,839,685 B1 | 1/2005 | Leistensnider | |
| 2003/0110107 A1* | 6/2003 | Hiatt et al. | 705/35 |
| 2003/0225657 A1 | 12/2003 | Whaley et al. | |
| 2005/0144107 A1 | 6/2005 | Plonski | |
| 2006/0100949 A1* | 5/2006 | Whaley et al. | 705/36 R |
| 2006/0253376 A1* | 11/2006 | Seale et al. | 705/37 |
| 2007/0198377 A1* | 8/2007 | Livingston et al. | 705/35 |
| 2007/0288341 A1 | 12/2007 | Shapack | |
| 2007/0294157 A1* | 12/2007 | Singla et al. | 705/36 R |
| 2008/0040258 A1 | 2/2008 | Weber | |
| 2008/0065522 A1 | 3/2008 | Diffenderffer | |
| 2008/0065529 A1 | 3/2008 | Bowen | |
| 2008/0120250 A1* | 5/2008 | Hiatt, Jr. | 705/36 R |
| 2008/0183506 A1* | 7/2008 | Mamorsky | 705/4 |
| 2008/0294574 A1* | 11/2008 | Hawkes et al. | 705/36 T |

OTHER PUBLICATIONS

"Alternative Agenda: Volatility Trading—Putting market volatility to work," Jones, C. (2009). Alternative agenda: Volatility trading—putting market volatility to work. Professional Wealth Management, Retrieved from http://search. proquest.com/professlonal/docview/205035208?accountid= 161862 (Jan. 22, 2014).*
John Ferry, Right time to overwrite, Special Reports—Equity derivatives: Call overwriting, Risk Management/Derivatives/Structured Products, Oct. 2008, vol. 21, No. 10.
Stuart J. Rosenthal, Covered Call Funds Resurrected, QWAFAFEW Presentation, Boston, MA, Mar. 15, 2005.

* cited by examiner

*Primary Examiner* — Kirsten Apple
*Assistant Examiner* — Joan Goodbody
(74) *Attorney, Agent, or Firm* — Toler Law Group, PC (57) ABSTRACT

An active overlay strategy based on rule-based risk management is implemented by a computer implemented method. The method includes receiving a data value representing implied volatility of a market. The method also includes automatically generating an order to sell call options. The order includes a quantity of call options to sell, where the quantity is determined at least in part based on an evaluation of the data value.

23 Claims, 10 Drawing Sheets

Low Volatility Example

| Period Ending | Beginning Dollar Amount | VXN Level | Covered Amount | C&I Return | Gain/Loss from C&I | Premium Income % | Premium Income ($) | Market Return (Nasdaq-100) | Loss from Covering Call (Market Return > or = to $0) | Ending Value | Total Return From Overlay Strategy |
|---|---|---|---|---|---|---|---|---|---|---|---|
| Friday, January 20, 2006 | $1,000.00 | 19.45 | 25.00% | 3.96% | $39.63 | 0.07% | $0.67 | -0.73% | $0.00 | $1,040.30 | 4.03% |
| Friday, February 17, 2006 | $1,040.30 | 15.11 | 50.00% | 3.12% | $32.44 | 0.51% | $5.33 | -0.07% | $0.00 | $1,078.07 | 3.63% |
| Friday, March 17, 2006 | $1,078.07 | 15.36 | 25.00% | 1.88% | $20.29 | 0.47% | $5.09 | 0.62% | -$1.68 | $1,101.76 | 2.20% |
| Friday, April 21, 2006 | $1,101.76 | 15.92 | 25.00% | 3.07% | $33.79 | 0.07% | $0.76 | 1.39% | -$3.82 | $1,132.50 | 2.79% |
| Friday, May 19, 2006 | $1,132.50 | 20.95 | 25.00% | -4.96% | -$56.17 | -0.05% | -$0.52 | -6.33% | $0.00 | $1,075.81 | -5.01% |
| Friday, June 16, 2006 | $1,075.81 | 21.69 | 50.00% | -4.58% | -$49.26 | 1.10% | $11.83 | -2.37% | $0.00 | $1,038.38 | -3.48% |
| Friday, July 21, 2006 | $1,038.38 | 23.2 | 50.00% | -6.25% | -$64.85 | 1.37% | $14.22 | -7.10% | $0.00 | $987.74 | -4.88% |
| Friday, August 18, 2006 | $987.74 | 18.45 | 50.00% | 10.27% | $101.49 | 1.53% | $15.11 | 8.58% | -$42.38 | $1,061.97 | 7.51% |
| Friday, September 15, 2006 | $1,061.97 | 17.75 | 50.00% | 4.10% | $43.49 | 0.72% | $7.70 | 3.55% | -$18.86 | $1,094.30 | 3.04% |
| Friday, October 20, 2006 | $1,094.30 | 16.7 | 43.75% | 3.57% | $39.11 | 1.06% | $11.60 | 4.73% | -$22.62 | $1,122.39 | 2.57% |
| Friday, November 17, 2006 | $1,122.39 | 15.33 | 25.00% | 4.65% | $52.23 | 0.57% | $6.45 | 5.33% | -$14.95 | $1,166.12 | 3.90% |
| Friday, December 15, 2006 | $1,166.12 | 15.15 | 25.00% | 1.88% | $21.87 | 0.46% | $5.34 | 0.44% | -$1.28 | $1,192.05 | 2.22% |
| Totals | | | | 21.33% | $214.05 | | $83.58 | 7.10% | -$105.58 | | 19.20% |

Simulation Results

| RETURNS AS OF 7/17/2009 | ACTIVE OVERLAY | 100% BXN | 100% C&I | NASDAQ-100 |
|---|---|---|---|---|
| One month | 3.98% | 3.65% | 4.06% | 3.81% |
| Three months | 11.37% | 12.81% | 9.96% | 12.80% |
| Six months | 29.98% | 26.40% | 29.39% | 27.47% |
| 12 months | -2.41% | -12.47% | -7.88% | -16.23% |
| Annualized 24 months | -5.78% | -11.97% | -8.10% | -13.39% |
| Annualized 36 months | 5.67% | -2.49% | 6.41% | 1.70% |
| Annualized 60 months | 7.88% | -0.33% | 8.05% | 1.87% |
| Annualized since inception (since Feb 16, 2001) | 5.64% | -1.35% | 1.48% | -4.31% |

RULES-BASED RISK MANAGEMENT

BACKGROUND

Trading financial securities can be considered a risk-reward process. Although gains can be realized (e.g., by buying a stock of a company that subsequently increases in price), losses can also be realized (e.g., buying a stock of a company that subsequently decreases in price). Thus, financial markets include inherent risks. Many strategies have been proposed to manage such risks. For example, one risk management strategy is to diversify holdings in a portfolio. Holdings may be diversified on the basis of asset type (e.g., small market capitalization vs. middle market capitalization vs. large market capitalization or value vs. growth), geographic location (e.g., United States markets vs. international markets), instrument type (e.g., stock vs. bond), and industry sector (e.g., technology vs. utilities). Another risk management strategy is to use long and short positions (e.g., long/short hedge funds). Generally, hedging may refer to the purchase or sale of a first security to reduce a risk inherent in owning a second security.

Another type of risk management strategy is a buy-write strategy. In a buy-write strategy, an investor may purchase one or more stocks and simultaneously sell (i.e., "write" call options) that correspond to the one or more stocks. The buy-write strategy has been used in indices offered by the Chicago Board Options Exchange (CBOE). In these indices, during each option period, a portfolio sells calls corresponding to 100 percent of the notional value of an underlying index (e.g., the Standard and Poor's (S&P) 500 index or the NASDAQ-100 ("N-100") index). While a goal of the buy-write strategy is to reduce risk and to provide downside protection as compared to a conventional index fund, under some scenarios, the buy-write strategy may underperform the index during a down market, thereby failing to meet the downside protection goal.

SUMMARY

The present disclosure describes a rules-based investment process based on a tradeoff between the benefits of collecting a premium on a call option and the risk of foregoing gains above the strike price of the call option at certain levels of implied volatility. When implied volatility is low, the premium income and hence the benefit of writing call options is low. When implied volatility is high, the premium income and hence the benefit of writing call options is high. A rules-based approach of writing option calls on a portion of the notional value of an underlying portfolio based on a value of a volatility index can be used as the basis of new indexes and as a differentiated investment process in the design of funds.

The present disclosure describes a computer-implemented method that includes receiving volatility data representing implied volatility of a stock market and automatically generating an order to sell call options based on the volatility data. The order indicates a quantity of call options to sell, and the quantity of call options to sell is determined at least in part based on an evaluation of the volatility data. The call options may be associated with S&P depositary receipts (SPDR), a midcap index, a small cap index, or any other index upon which call options can be written, or any combination thereof. The volatility data may include the CBOE S&P 500 Volatility Index (i.e., VIX) or the CBOE N-100 Volatility Index (i.e., VXN), among other alternatives.

For example, volatility data representing implied volatility of a market, such as the VIX index or the VXN index, may be used to automatically generate an order to sell call options. The order includes a quantity of call options to sell, where the quantity is determined at least in part based on an evaluation of the volatility data.

As another example, volatility data representing implied volatility of a market index, such as the VIX or the VXN, may be used to generate an active buy-write index. For example, the volatility data may be used to generate an active buy-write index associated with an underlying stock market index, such as the N-100 index or the S&P 500 index.

Further details regarding particular embodiments are described in reference to the following figures:

BRIEF DESCRIPTION OF THE DRAWINGS

FIG. 3 depicts a chart to illustrate the annual return of a traditional fund (e.g., a Communications and Information (C&I) stock fund), the annual return of the Nasdaq-100 ("N-100") index, and the calculation of the annual return of a fund using an active overlay strategy using active overlay rules of the present disclosure during an illustrative year of low market volatility;

DETAILED DESCRIPTION

In a particular embodiment, a computer-implemented method is disclosed. The method includes comparing a volatility index value to a plurality of volatility ranges. Based on the comparison, a percentage of a notional value of an equity portion of a portfolio of securities is determined. Based on the percentage and based on the notional value of the equity portion of the portfolio, at least one proposed financial market transaction is generated. The method includes automatically acquiring income by performing the at least one proposed financial market transaction, where the income is derived from call option premiums. For example, volatility data representing implied volatility of a market may be used to automatically generate an order to sell call options. The order includes a quantity of call options to sell, where the quantity is determined based on an evaluation of the volatility data.

As an example, based on the percentage and based on the notional value of the equity portion of the portfolio, one-month "At The Money" calls (e.g., the first strike price above the spot price) are written. This process is repeated on the third Friday of each month. The method includes automatically acquiring income, where the income is derived from selling call options. This income is invested in the underlying portfolio on a pro-rata basis. For example, volatility data representing implied volatility of a market may be used to automatically generate an order to sell call options.

In another particular embodiment, a system is disclosed that includes an interface, a memory device, and a processor coupled to the memory device. The interface is configured to receive a volatility index value. The memory device is configured to store a plurality of volatility ranges. Each volatility range is associated with a range of volatility index values, and each volatility range is associated with a percentage of a notional value of an equity portion of a portfolio of securities. The processor is configured to identify a particular volatility range that includes the volatility index value and to identify a particular percentage of the notional value associated with the particular volatility range. Based on the particular percentage and the notional value of the equity portion of the portfolio, the processor is configured to automatically generate at least one proposed financial market transaction, such as selling call options.

In another particular embodiment, a computer-implemented method of generating an index includes receiving volatility data representing implied volatility of a market index and generating an active buy-write index associated with the market index. The active buy-write index is generated based on a market performance of a portfolio that includes a plurality of equities associated with the market index (e.g., the 100 stocks of the N-100 index or the 500 stocks of the S&P 500 index) and is based on a particular allotment of call options associated with the applicable index. The particular allotment of call options is determined based on the volatility data value.

Prior to public use of the methodology of this disclosure, the Chicago Board Options Exchange (CBOE) described a methodology for a benchmark index (BXM index) designed to reflect buy-write performance. The investment process of the BXM index involves writing an "At The Money" call (first strike above the index value) on the S&P 500 index. As another example, the BXN index (the CBOE N-100 Buy-Write Index) is a benchmark index that measures the performance of a theoretical portfolio that owns a portfolio of the stocks included in the Nasdaq-100 index and writes N-100 covered call options on the third Friday of each month. The approach as used in the BXM or BXN index consistently overwrites 100 percent of the notional value of an associated underlying index (e.g., the S&P 500 index or the N-100 index, respectively).

The VXN index (the CBOE N-100 Volatility Index) measures the implied volatility of the N-100 index over the next thirty days, and the VIX index (the CBOE S&P 500 Volatility Index) measures the implied volatility of the S&P 500 index over the next thirty days. It should be noted that the VXN and the VIX indicate "implied volatility" which may be greater than or less than the actual volatility of the underlying index. A 100 percent overwrite when implied volatility is low (as measured by a volatility index) may reduce the total return of the buy-write strategy by limiting the upside potential of the entire portfolio. For the BXN index, this may lead to lower returns, including five-year periods when the BXN index produces negative returns that are greater in magnitude than the N-100 index, thereby failing to provide a downside cushion when compared to the underlying Nasdaq-100 index.

Figure 1:
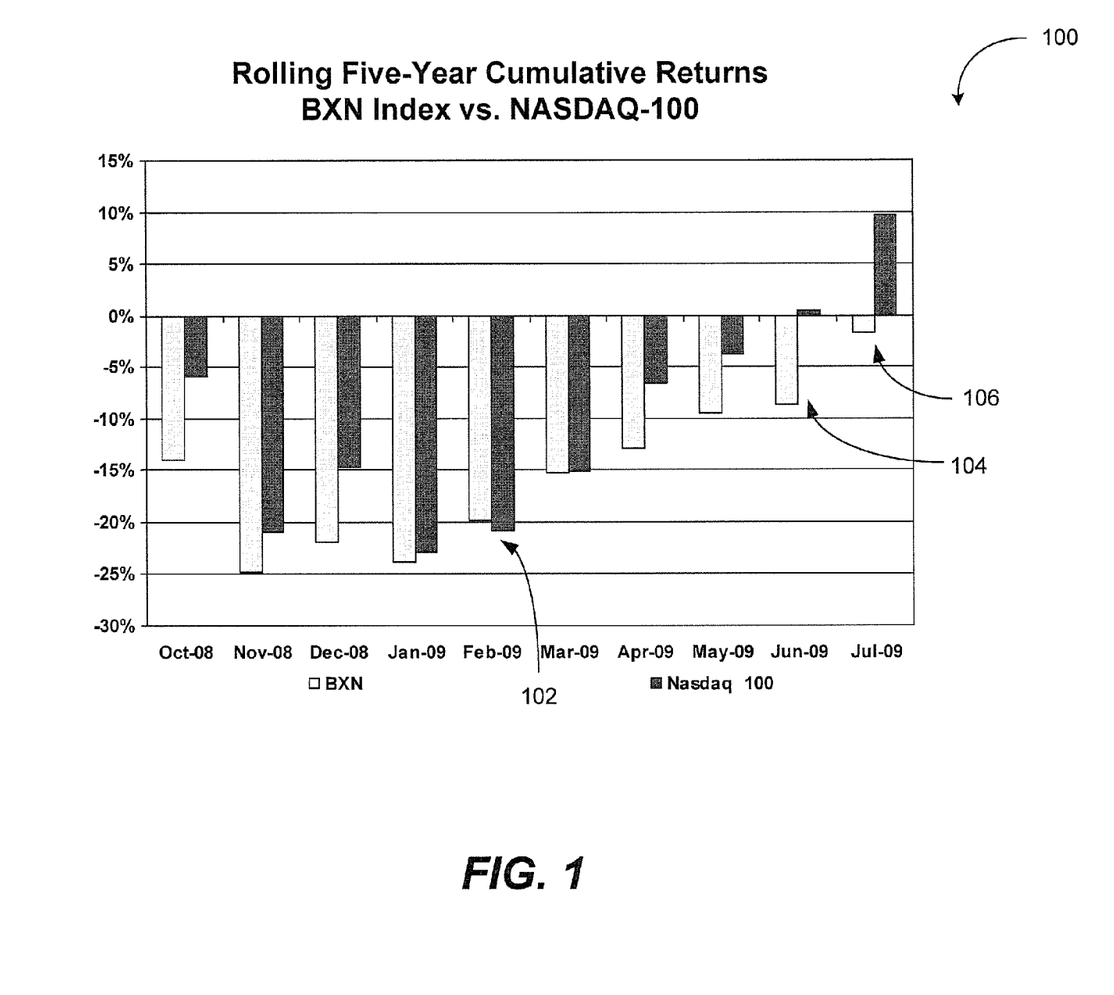
FIG. 1 is a graph to illustrate rolling five-year cumulative returns of the BXN index (the CBOE N-100 BuyWrite Index) versus the Nasdaq-100 ("N-100") index for the periods ending from October 2008 through July 2009.

To further illustrate, FIG. 1 depicts rolling five-year cumulative returns of the BXN index versus the N-100 index, as shown at 100. The rolling five-year periods depicted in FIG. 1 end on the third Friday of each indicated month. For example, the data associated with the October 2008 rolling five-year period represents the rolling five-year cumulative returns from the third Friday in October 2003 to the third Friday in October 2008. As illustrated in FIG. 1, the rolling five-year cumulative return of the BXN index in these periods of negative returns is lower than the rolling five-year cumulative return of the N-100 index in each month except February 2009, as shown at 102. Further, the cumulative return of the BXN index in five-year periods in which the N-100 index produces a positive return (e.g., June 2009 and July 2009) is a negative return, as shown at 104 and 106, respectively. Thus, there is an apparent performance problem with the BXN index, at least in certain market conditions.

The rules-based approach of the present disclosure addresses this performance problem by reducing the proportion of the portfolio that is over-written when premiums are low (e.g., in low implied volatility markets), thereby permitting a greater portion of an equity portfolio to participate in any month in which the increase in the index is greater than the strike price of corresponding sold option calls. In a particular embodiment of the present disclosure, specific rules that vary the amount of calls written each month based on the level of the VXN index or the VIX index are applied to automatically generate call option financial transactions.

The rules-based approach of the present disclosure may improve the expected risk/reward results relative to the existing practice of a 100 percent call overwrite (e.g., the BXM or the BXN index strategy). The present disclosure describes a more complex set of rules that determine the amount of the portfolio or index that will be overwritten based upon the specific level of implied volatility of the index (e.g., VIX for the S&P 500 and the VXN for the N-100 index). The rules-based approach of the present disclosure may be used to create new indexes that may serve as the basis for additional investment products, or the rules-based approach may be used for exchange traded funds (ETFs) or to enhance other funds (e.g., closed-end funds or mutual funds).

The present disclosure is related to an active and dynamic approach to call writing. The dynamic call writing strategy (described herein as an "active overlay strategy") is flexible and adjusts to different option premium environments. The strategy balances a tradeoff between the benefits of collecting premiums on a written call and the risk of foregoing gains above the strike price at certain levels of implied volatility. When implied volatility is low, the premium income and hence the benefit of writing call options is low. When implied volatility is high, premium income and the benefit of writing call options is high.

In a particular embodiment, the rules-based approach of the present disclosure (i.e. the "active overlay strategy") writes one month "At The Money" calls (first strike above the index value) on the N-100 index on the third Friday of each month on a percentage (e.g., from 25% to 90% based on volatility data) of the portfolio. When implied volatility is low (e.g., the VXN on the third Friday of the month is 17 or below), calls are written on 25% of the notional value of the portfolio. When implied volatility is high (e.g., the VXN on the third Friday of the month is greater than or equal to 18 but less than 33), and premiums are high, the strategy may increase the calls written percentage to 50 percent of the notional value of the portfolio. It should be noted that in this particular application, the underlying portfolio is different than the index upon which the calls are being written. Therefore, the present disclosure may be not be considered a "call overwrite" strategy per se. When implied volatility is very high (e.g., the VXN on the third Friday of the month is 34 or above), and premiums are very high, the calls written percentage may be increased to a maximum percentage (e.g., 90%) of the value of the portfolio. Further, when the VXN on the third Friday of the month is greater than 17 and less than 18, the calls written percentage may be determined as a proportional percentage from 25% to 50% of the notional value of the portfolio. When the VXN on the third Friday of the month is greater than or equal to 18 and less than 33, the calls written percentage may be 50% of the notional value of the portfolio. When the VXN on the third Friday of the month is greater than or equal to 33 and less than 34, the calls written may increase proportionately from 50% to 90% of the notional value of the portfolio. It should be noted that the percentages listed are merely illustrative and may vary in alternative embodiments. Further, the minimum overlay percentage may be zero percent. In such cases, no calls may be written for the particular period of time when the implied volatility is below the lowest threshold.

The rules-based approach of the present disclosure may be used by a variety of open and closed-end investment companies and may potentially be offered as a family of exchange traded funds (ETFs). Similarly, the rules-based approach may be used to offer an open-end fund (e.g., a mutual fund) or a closed-end fund. Clients may benefit by receiving the combination of an index tracking or actively managed portfolio with a rules-based call writing strategy designed to cushion downside volatility but still capture a significant amount of upside opportunity, while providing current income. The net result may be improved risk/reward characteristics. Advisors may be able to offer an investment with a unique set of risk/reward parameters along with reasonable current income.

The following hypothetical performance illustrations show the effect of constructing an active overlay strategy that uses the A-share NAV performance of the Seligman Communications and Information Fund ("the C&I fund") as an example of the underlying equity portion of the portfolio and that writes "At The Money" calls on the N-100 index on between 25% and 90% of the notional value of the equity portion of the portfolio each month. The returns on the active call-writing strategy are computed based on the actual returns of the BXN index, which includes the returns associated with writing one-month "At The Money" calls on the N-100 index on the third Friday of each month and the Net Asset Value returns of the C&I fund Class A shares, respectively.

The percentage of the notional value of the portfolio overwritten is determined based on a set of rules. The VXN index is a measure of market expectations of near-term volatility relating to the N-100 index. The inception date of VXN is Feb. 2, 2001. For example, when the VXN is 17 or below, 25% of the value of the portfolio may be overwritten. As another example, when the VXN is greater than 17 but less than 18, the calls written percentage may be increased proportionately up to 50% of the value of the portfolio. As another example, when the VXN is at least 18 but less than 33, 50% of the value of the portfolio may be overwritten. As another example, when the VXN is at least 33 but less than 34, the call overwrite percentage may be increased proportionately up to 90% of the value of the portfolio. As another example, when the VXN is 34 or above, 90% of the value of the portfolio may be overwritten.

Multiple active overlay research simulations were performed to determine the overwrite percentages in the particular illustrative embodiment described above. For example, monthly third Friday-to-third Friday returns for the C&I fund, the N-100 index and the BXN index were calculated. An interface was built to test varying weights of the active overlay based on third-Friday VXN levels. The active overlay rules were determined by simulating a wide range of possible combinations of active overlay weights and VXN levels. Further, rules-based monthly third Friday-to-third Friday time-weighted returns for the active overlay were calculated. In addition, monthly third Friday-to-third Friday premium income was determined.

With respect to third Friday-to-third Friday return calculations, monthly third Friday-to-third Friday time-weighted returns for the BXN index were calculated. The BXN index daily closing levels were obtained from the CBOE website. The CBOE data was scrubbed to account for Friday market holidays and miscellaneous database anomalies (for example, the CBOE VXN and BXN databases include missing or duplicate entries for several dates). Returns were calculated by comparing a particular third-Friday level to a previous third-Friday level. Further, monthly third Friday-to-third Friday time-weighted returns for the C&I fund and the N-100 index were calculated. A table of daily returns for the C&I fund and the N-100 index starting Friday, Feb. 16, 2001 was generated. The C&I fund total return and the N-100 index price levels were obtained from FactSet Research Systems, Inc. at 601 Merritt 7 3rd Floor Norwalk, Conn. 06851. Cumulative daily returns were calculated starting Feb. 16, 2001. Based on this data, third Friday-to-third Friday returns were calculated.

As an example, starting on Friday, Feb. 16, 2001 (e.g., the third Friday of February in 2001), the cumulative return was negative 4.32%. On Friday Mar. 16, 2001 (e.g., the third Friday of March in 2001), the cumulative return was negative 22.87%. The cumulative return represents the total return from the beginning of the trading session on Friday Feb. 16, 2001 to the end of the trading session on Friday Mar. 16, 2001. Thus, the third Friday-to-third Friday point-to-point return for February to March 2001 is negative 19.39%, determined by the formula $[(1+-22.87\%)/(1+-4.32\%)]-1$.

An interface was built that allowed return calculations to include varying weights of call-writing based on VXN levels. Research indicated that VXN levels (and corresponding overlay weights) may be segmented into five bands (e.g., volatility ranges): 1) Bottom (e.g., low); 2) Lower-Middle (e.g., medium-low); 3) Middle (e.g., medium); 4) Upper-Middle (e.g., medium-high); and 5) Top (e.g., high). Various combinations were tested to balance downside cushion and premium income with upside participation. Based on tests, the following rules were created: BOTTOM BAND: 17 or below, use a 25 percent overlay; LOWER MIDDLE BAND: greater than 17 but less than 18, use a proportionate overlay of 25 to 50 percent; MIDDLE BAND: greater than or equal to 18 and less than 33, use an overlay of 50 percent; UPPER-MIDDLE BAND: greater than or equal to 33 and less than 34, use a proportionate overlay of 50 to 90 percent; TOP BAND: 34 or above, use an overlay of 90 percent.

For example, on Friday Apr. 17, 2009, the VXN level was 35.29. As such, the overlay weight for the period ending Friday, May 15, 2009 was 90%. As another example, on Friday, May 15, 2009, the VXN level was 33.14. As such, the overlay weight for the period ending Friday, Jun. 19, 2009 was 56%. As another example, on Friday, Jun. 19, 2009, the VXN level was 28.3. As such, the overlay weight for the period ending Friday, Jul. 17, 2009 was 50%.

It should be noted that test simulations did not seek to maximize excess return. For example, alternative rules were tested. One alternative rule (as illustrated at 232 in FIG. 2) used a BOTTOM BAND: 20 or below, use a 25 percent overlay; LOWER MIDDLE BAND: greater than 20 and less than 28, use an overlay of 25 percent; MIDDLE BAND: greater than or equal to 28 and less than 33, use a proportionate overlay of 25 to 50 percent; UPPER MIDDLE BAND: greater than or equal to 33 and less than 34, use a proportionate overlay of 50 to 90 percent; TOP BAND: 34 or above, use an overly of 90 percent. This alternative rule resulted in an excess return of 4.69% versus a return of 4.16% for the selected rule (based on an average annual return from Feb. 16, 2001 to Jul. 17, 2009). Although the alternative test rule resulted in a higher excess return relative to the C&I fund performance, the selected rule resulted in a greater downside cushion and greater premium income at lower levels of volatility. Thus, rules of the active overlay strategy may be modified to further increase excess return at the expense of downside cushion, or vice versa.

To illustrate, the active overlay return may be calculated based on an overlay weight, a return from a buy-write strategy (e.g., the return based on the BXN index ($R_{BXN}$)), a return from a tracking fund ($R_{C\&I}$), and the return of an index ($R_{N-100}$). Thus, the following calculation is performed:

$$[\text{OVERLAY WEIGHT} \times (R_{BXN} + (R_{C\&I} - R_{N-100})] + [(1-\text{OVERLAY WEIGHT}) \times R_{C\&I}]$$

To illustrate using the example dates listed above, the active return overlay calculation for the third Friday month ending Jul. 17, 2009:

$$[50\% \times (3.65\% + (4.06\% - 3.81\%)] + [50\% \times 4.06\%] = 3.98\%$$

The monthly premium calculation may depend on whether the N-100 index was positive or negative. When the N-100 index was positive, the monthly premium may be calculated based on [OVERLAY WEIGHT×$R_{BXN}$]. When the N-100 index was negative, the monthly premium may be calculated based on [OVERLAY WEIGHT×($R_{BXN}$−$R_{N-100}$)]. To illustrate, for the third Friday month ending Jul. 17, 2009, the monthly premium calculation would be 50%×3.65%=1.83%.

Figure 2:
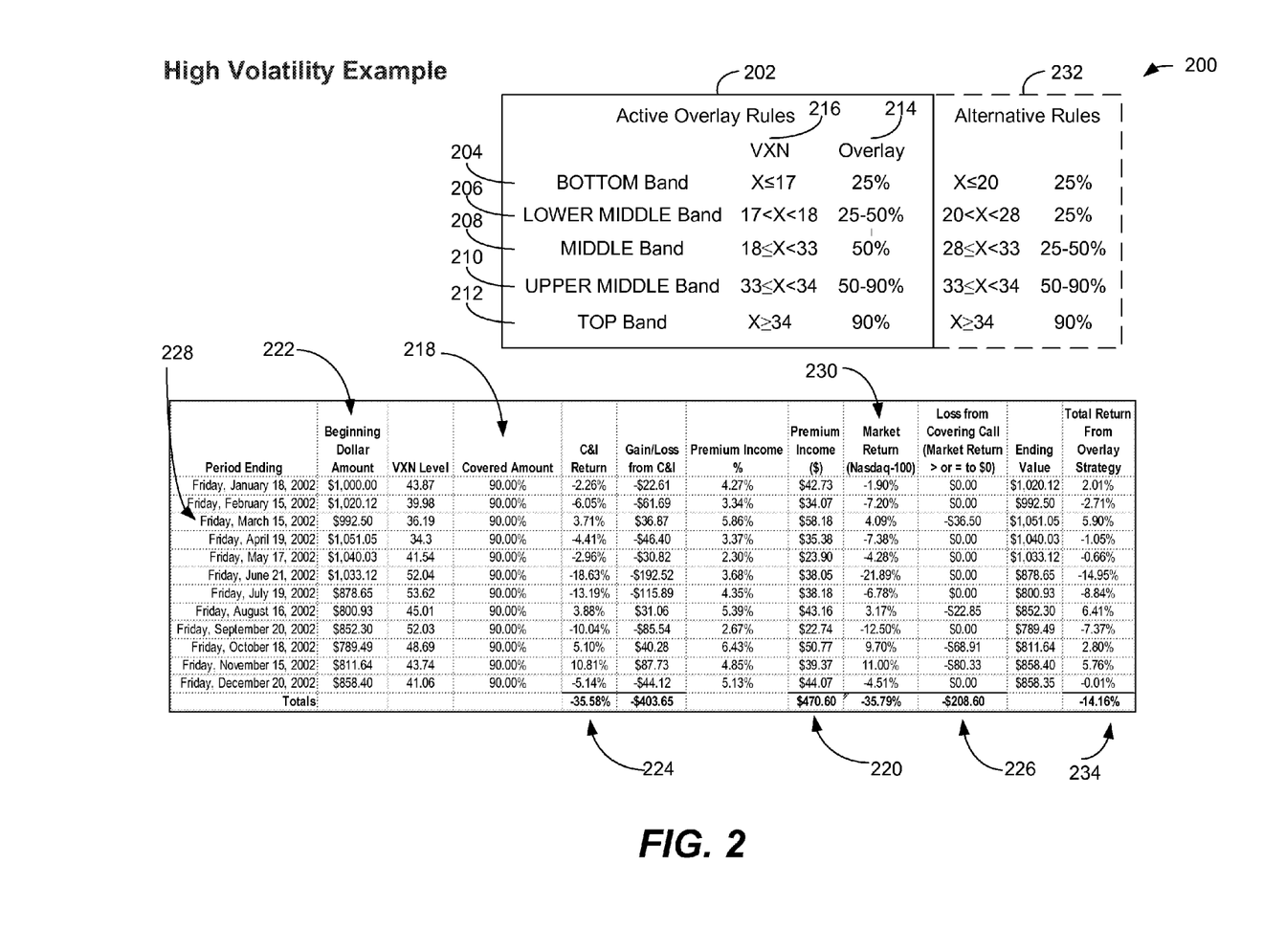
FIG. 2 depicts a chart to illustrate the annual return of a traditional fund (e.g., Seligman Communications and Information fund (C&I fund)), the annual return of a Nasdaq-100 ("N-100") index, and the calculation of the annual return of a fund using an active overlay strategy using active overlay rules of the present disclosure during an illustrative year of high market volatility. The "active overlay" strategy uses the active overlay rules of the present disclosure with the returns of Seligman Communications and Information Fund as the returns of the underlying portfolio.

Referring to FIG. 2, a detailed high volatility market example is illustrated, at 200. Active overlay rules 202, as described above, are shown in FIG. 2. For example, the active overlay rules 202 include a bottom band 204, a lower middle band 206, a middle band 208, an upper middle band 210, and a top band 212. For each band, the active overlay rules 202 include an overlay percentage 214 corresponding to a VXN range 216. For example, in the embodiment illustrated, the VXN range 216 associated with the bottom band 204 is 17 or below, and the corresponding overlay percentage 214 is 25 percent. As another example, in the embodiment illustrated, the VXN range 216 associated with the lower middle band 206 is greater than 17 but less than 18, and the corresponding overlay percentage 214 is a proportionate overlay of 25 to 50 percent. As another example, in the embodiment illustrated, the VXN range 216 associated with the middle band 208 is greater than or equal to 18 and less than 33, and the corresponding overlay percentage 214 is 50 percent. As another example, in the embodiment illustrated, the VXN range 216 associated with the upper middle band 210 is greater than or equal to 33 and less than 34, and the corresponding overlay percentage 214 is a proportionate overlay of 50 to 90 percent. As another example, in the embodiment illustrated, the VXN range 216 associated with the top band 212 is 34 or greater, and the corresponding overlay percentage 214 is 90 percent.

FIG. 2 illustrates that in periods of high volatility such as the year 2002, premium income may be very high. In such high volatility markets, a maximum amount of portfolio coverage 218 (e.g., 90%) corresponding to the top band 212 may be used because the premiums for writing calls are high. High levels of the VXN are typically associated with down markets. The VXN is an index of "implied volatility" which may be greater than or less than actual volatility. As shown in FIG. 2, accumulated gross premium income 220 for the year was over 47% of initial assets 222 at the start of the year. However, because of the down market, this was more than offset by the negative return 224 from the C&I portfolio and the cost of covering calls 226. When the third Friday-to-third Friday market return of the N-100 index is positive, a loss may result from covering the call. For example, for the period 228 ending Friday Mar. 15, 2002, the market return 230 for the N-100 index was 4.09 percent. As a result, a loss (e.g., $36.50) was associated with the cost of covering the call 226. Alternatively, when the market return was negative, there is no such loss associated with the cost of covering the call.

It should be noted that when a call option is exercised, the cash proceeds of the option sale transaction may be used to rebalance the equity portfolio as a result of the reduction of a portion of the equity portfolio associated with the equities sold in the option transaction. For example, the cash proceeds from the sale of calls that generate income from the call option premiums (e.g., an expired call option) may be used to purchase securities to be added to the equity portion of the securities portfolio. The portfolio includes an equity portion and an income portion.

To illustrate, in the year 2002 (e.g., a high volatility year), using a hypothetical beginning dollar amount of $1,000, the net loss of the C&I fund in 2002 was $403.65. The gross premium income in 2002 was $470.60. The loss from covering the calls was $208.60. Thus, the total return 234 using the active overlay strategy and the C&I fund in 2002 was negative 14.16%, versus a return of negative 35.58% for the original C&I fund in 2002.

FIG. 3 illustrates that in periods of low implied volatility such as the year 2006, premium income may be relatively low. In such low implied volatility markets, a smaller amount of portfolio coverage 302 (e.g., 25-50%) may be used because the premiums for writing calls are lower. Low implied volatility is typically associated with up markets. As shown in FIG. 3, accumulated gross premium income 304 for the year was only 8% of initial assets 306. However, the return 308 of the C&I fund in the year 2006 was over 21 percent.

To illustrate, in the year 2006 (e.g., a low volatility year), using a hypothetical beginning dollar amount of $1,000, the net gain 318 of the C&I fund in 2006 was $214.05. The gross premium income 304 in 2006 was $83.58. The loss from covering the calls 310 was $105.58. Thus, the total return 316 using the active overlay strategy and the C&I fund in 2006 was 19.20%, versus a return 308 of 21.33% for the original C&I fund in 2006. Thus, FIG. 3 illustrates that the overlay strategy results in reduced upside gains in low implied volatility years (e.g., 2006), in exchange for a downside cushion in high implied volatility years (e.g., 2002). The downside cushion may prevent the buy-write strategy from underperforming an index during a down market.

Figure 4:
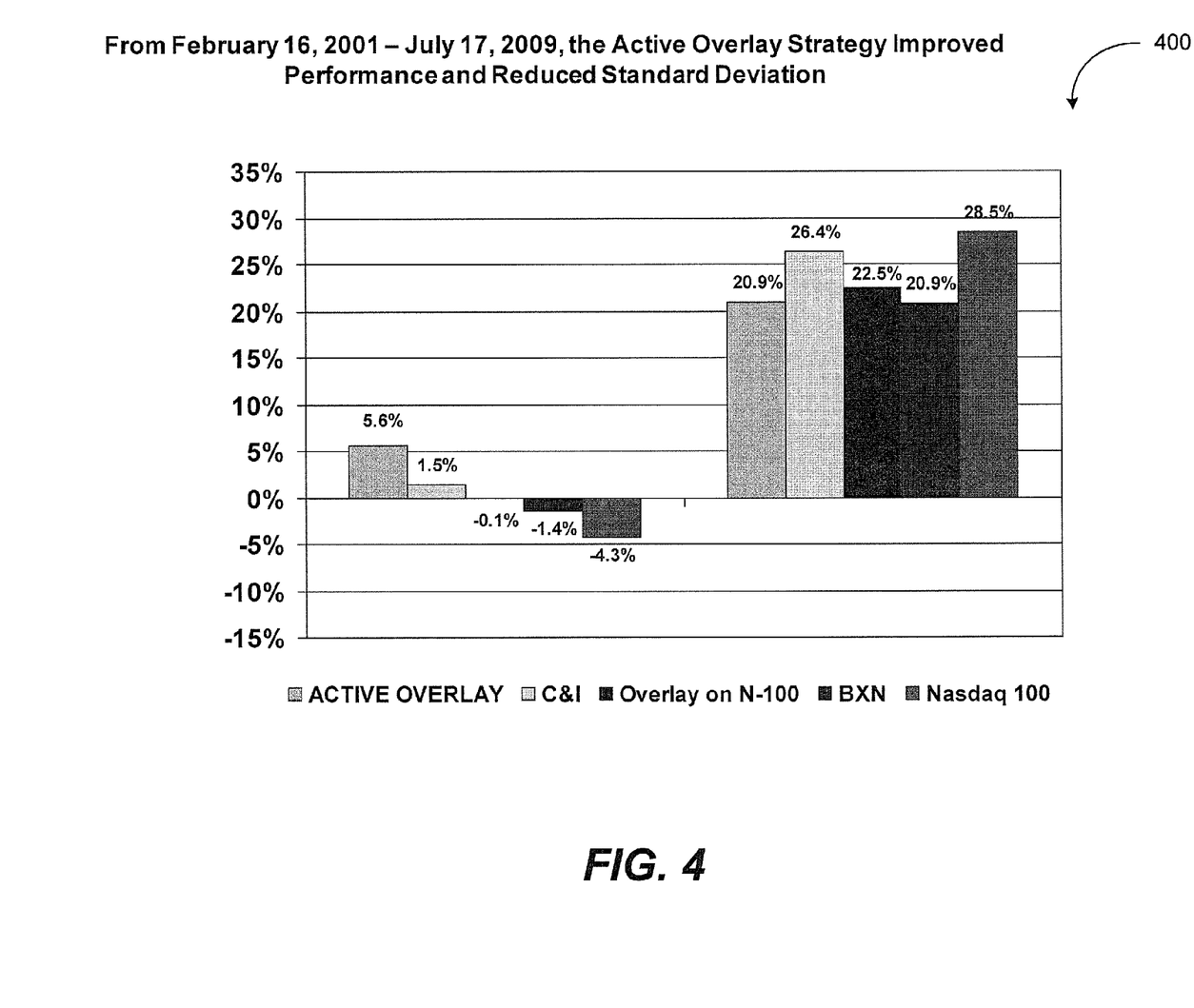
FIG. 4 is a graph to illustrate the performance of the active overlay strategy of the present disclosure with the BXN index strategy and the N-100 index in terms of annual return and standard deviation.

FIG. 4 illustrates that from Feb. 16, 2001 to Jul. 17, 2009, the BXN index strategy (e.g., 100 percent buy-write) produced a higher average annual return (negative 1.4%) than the N-100 index (negative 4.3%) with 73% of its standard deviation (e.g., 20.9% versus 28.5%), at 400. Further, FIG. 4 illustrates that from Feb. 16, 2001 to Jul. 17, 2009, the C&I fund produced a higher average annual return (1.5%) than N-100 index (negative 4.3%) with a standard deviation in line with the N-100 index (e.g., 26.4% versus 28.5%). Still further, FIG. 4 illustrates that from Feb. 16, 2001 to Jul. 17, 2009, the overlay strategy of the present disclosure (e.g., an overlay percentage dependent on implied market volatility) improved performance and reduced the standard deviation. For example, referring to FIG. 4, the active overlay strategy applied to the C&I fund produced an average annual return (5.6%) with a standard deviation of 20.9 percent. The overlay strategy applied to the N-100 index produces an average annual return (negative 0.1%) with a standard deviation of 22.5 percent.

Figure 5:
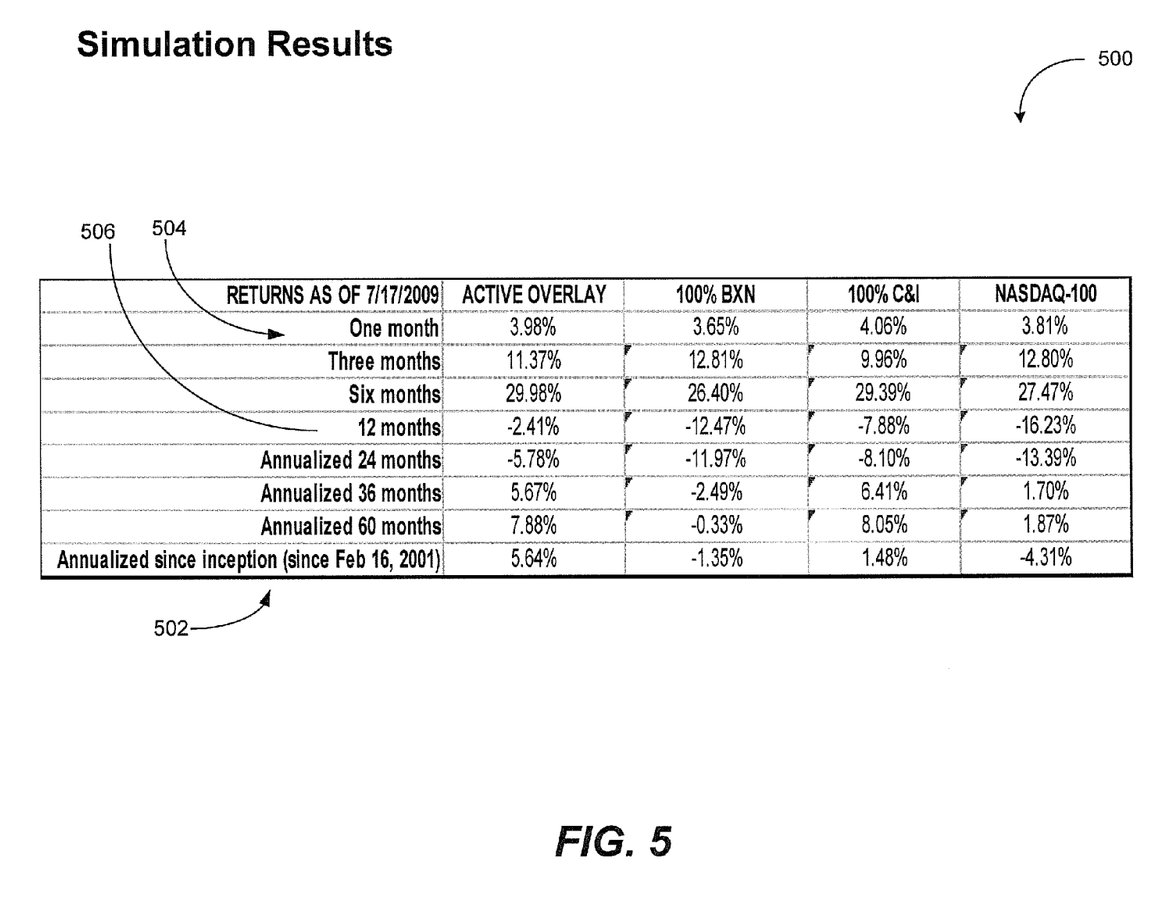
FIG. 5 depicts a chart to illustrate simulation results of the performance of the active overlay strategy of the present disclosure compared to the BXN index strategy and the N-100 index in terms of annual return over multiple periods between the inception of the VXN index and a hypothetical end date.

FIG. 5 illustrates the returns as of Jul. 17, 2009 using the active overlay strategy, the BXN index strategy (e.g., 100 percent overwrite), the C&I fund, and the N-100 index, at 500. Note that the annualized return 502 since the inception of the VXN volatility index on Feb. 16, 2001 is 5.64% for the active overlay strategy, negative 1.35% for the BXN index strategy (e.g., the 100 percent over-write strategy), 1.48% for the C&I fund, and negative 4.31% for the N-100 index. Further, FIG. 5 illustrates that while the active overlay strategy may result in less upside potential in up markets (e.g., low volatility markets), the active overlay strategy may provide a downside cushion in down markets (e.g., high volatility markets). For example, in the up market period 504 one month prior to Jul. 17, 2009, the active overlay approach resulted in a return of 3.98%. While this return exceeded the BXN index return and the N-100 index return, the C&I fund returned 4.06% in this period. However, in the down market period 506 of the twelve months between Jul. 18, 2008 and Jul. 17, 2009, the active overlay approach resulted in a return of negative 2.41%, while the BXN index strategy had a return of negative 12.47%, the C&I fund returned negative 7.88%, and the N-100 index returned negative 16.23 percent. Thus, in this down market period twelve months prior to Jul. 17, 2009, the active overlay strategy provided increased downside cushion (e.g., reduced the negative return).

Figure 6:
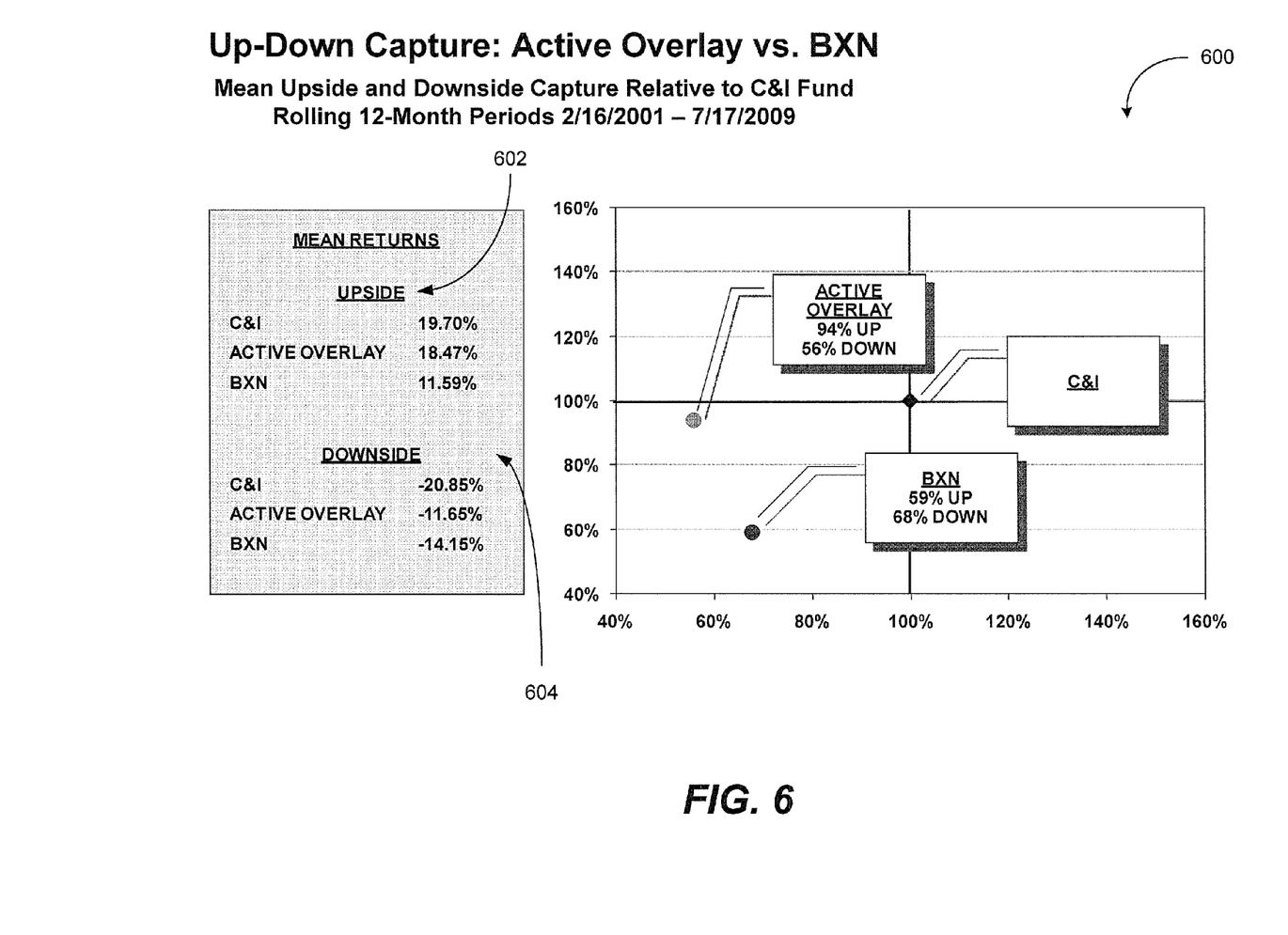
FIG. 6 is a graph to illustrate the upside and downside capture of the active overlay strategy and the BXN index strategy relative to an investment in Seligman Communications and Information Fund.

FIG. 6 illustrates the upside and downside capture relative to the C&I fund in rolling twelve month periods from Feb. 16, 2001 (the first third Friday after the inception of the VXN N-100 volatility index) to Jul. 17, 2009, at 600. The mean upside return 602 of the active overlay strategy was 18.47%, better than the mean BXN index 100 percent over-write strategy (e.g., 11.59%) but less than the mean upside return of the C&I fund without the active overlay strategy (e.g., 19.70%). Further, the mean downside return 604 of the active overlay strategy is negative 11.65%, better than the mean BXN index 100 percent over-write strategy (e.g., negative 14.15%) and better than the mean C&I fund without the active overlay strategy (e.g., negative 20.85%). Thus, FIG. 6 further illustrates that while the active overlay strategy may result in less upside potential in up markets compared to the C&I fund (e.g., low volatility markets), the active overlay strategy may provide a downside cushion in down markets (e.g., high volatility markets). In addition, FIG. 6 illustrates that the active overlay strategy provides a better risk/reward profile by capturing an average of 94% of the upside return of the C&I Fund during 12 month periods when the C&I fund posted a positive return compared to only 59% for the BXN strategy, and experienced on average only 56% of the negative return of the C&I Fund during 12 month periods when the C&I Fund posted a negative return compared to 68% percent of the downside experienced by the BXN strategy.

Figure 7:
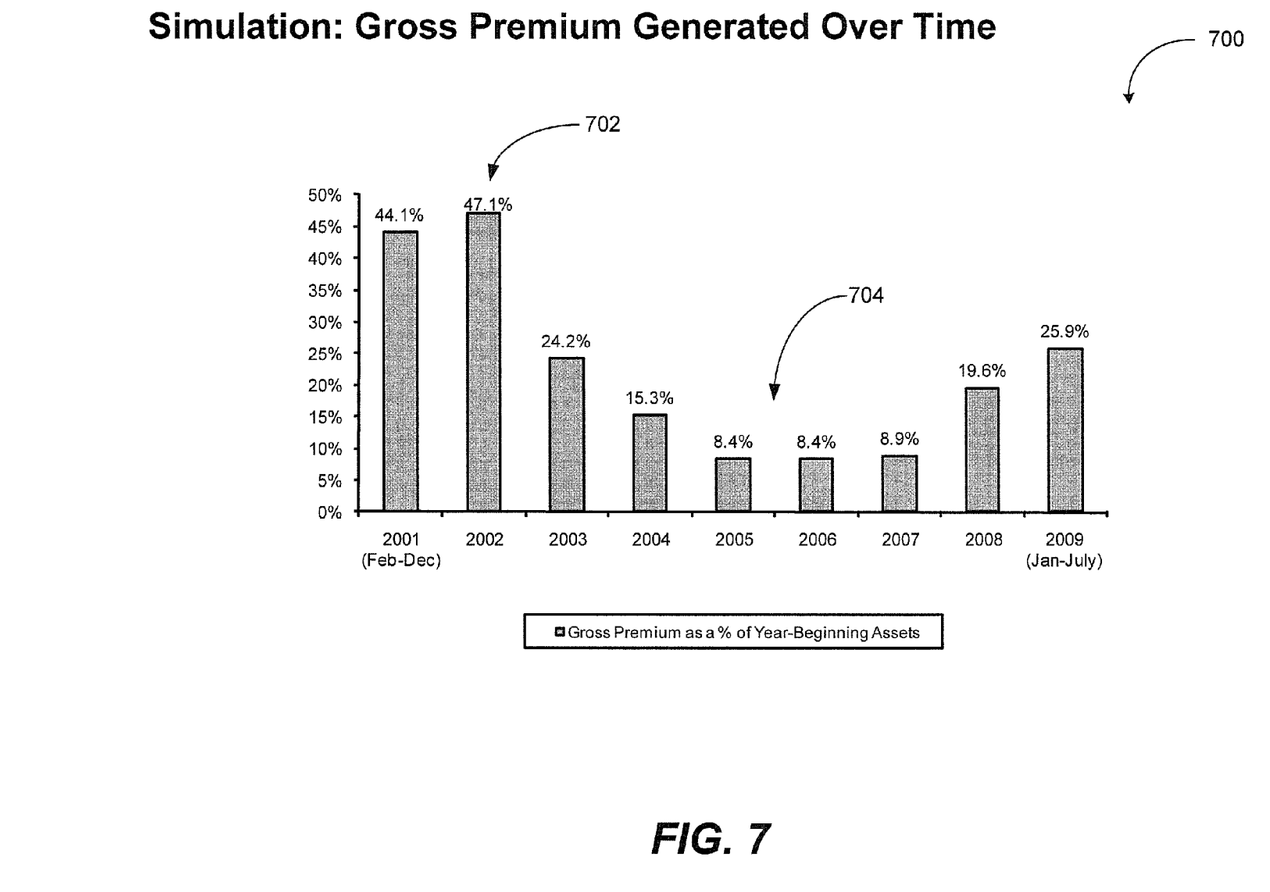
FIG. 7 is a graph to illustrate simulation results of the variable gross premiums generated over time using the active overlay strategy.

FIG. 7 illustrates an analysis of gross premiums generated over time, at 700. Gross premiums from writing calls may vary with market conditions and an amount of a portfolio pledged as collateral for the calls. Financial advisors and platform analysts typically use gross premium as a gauge for assessing whether payout levels for closed-end funds are sustainable. FIG. 7 illustrates that the gross premiums received using the active overlay strategy (e.g., more calls are written during years such as 2002 when premiums were high, and fewer calls were written during years such as 2005 and 2006 when premiums were relatively low). It shows that the combination of the percent of the notional value of the underlying portfolio upon which calls were written and the changing levels of call premiums produces higher gross premium income in highly volatile years and lower premium income in less volatile years. For example, in the relatively volatile year of 2002, calls were written on 90% of the notional value of the portfolio and the gross premiums 702 represented 47.1% of the year-beginning assets. By contrast, in the less volatile years of 2005 and 2006, calls were written on 25% to 50% of the notional value of the portfolio and the gross premiums 704 represented 8.4% of the year-beginning assets.

Figure 8:
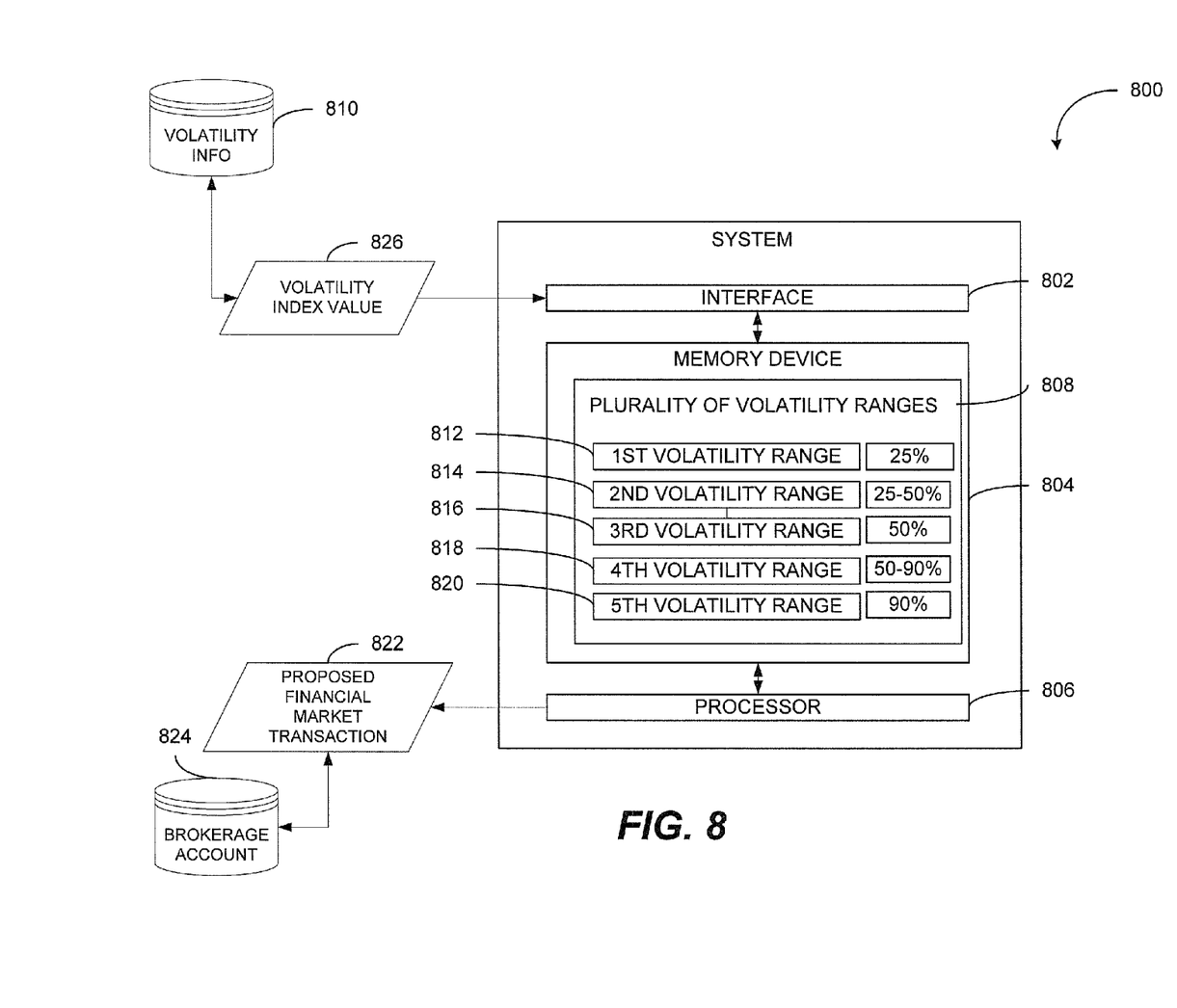
FIG. 8 is a block diagram to illustrate a particular embodiment of a computer system to execute a volatility-based option strategy, such as the active overlay strategy.

Referring to FIG. 8, an illustrative embodiment of a system of the present disclosure is illustrated, at 800. The system includes an interface 802, a memory device 804, and a processor 806 coupled to the memory device 804. The system 800 may enable active risk management by determining an appropriate amount of call options to sell based on a volatility index in order to receive call option premiums that provide a downside cushion to an equity portfolio.

The interface is configured to receive a volatility index value 826. The memory device 804 is configured to store a plurality of volatility ranges 808. Each of the volatility ranges 808 is associated with a range of volatility index values and is associated with a percentage of a notional value of an equity portion of a portfolio of securities. The processor 806 is configured to evaluate the volatility index value 826 with respect to the plurality of volatility ranges 808. The processor 806 is configured to identify a particular volatility range of the plurality of volatility ranges 808 that includes the volatility index value 826. The processor is configured to identify a particular percentage of the notional value associated with the particular volatility range. The particular percentage is typically less than 100 percent. The processor is further configured to automatically generate at least one proposed financial market transaction 822 based on the particular percentage and based on the notional value of the equity portion of the portfolio. In one embodiment, the at least one proposed financial transaction 822 includes a sale of covered call options associated with a security included in the equity portion of the portfolio. The number of call options sold is determined by the percentage applied to the notional value of the equity.

In operation, the interface 802 receives the volatility index value 826 from a volatility information source 810 (e.g., a database of volatility information). For example, the volatility information source 810 may include VIX or VXN or other indexes of implied volatility as the source of market volatility information. The processor 806 compares the volatility index value 826 to the plurality of volatility ranges 808. In the embodiment illustrated in FIG. 8, the plurality of volatility ranges 808 includes a first volatility range 812, a second volatility range 814, a third volatility range 816, a fourth volatility range 818, and a fifth volatility range 820. For example, the first volatility range 812 may correspond to a bottom band (e.g., the bottom band 204 of FIG. 2) corresponding to VXN values of 17 or below. As another example, the second volatility range 814 may correspond to a lower-middle band (e.g., the lower middle band 206 of FIG. 2), corresponding to VXN values greater than 17 and less than 18. As another example, the third volatility range 816 may correspond to a middle band (e.g., the middle band 208 of FIG. 2), corresponding to VXN values that are greater than or equal to 18 and less than 33. As another example, the fourth volatility range 818 may correspond to an upper-middle band (e.g., the upper-middle band 210 of FIG. 2), corresponding to VXN values that are greater than or equal to 33 and less than 34. As another example, the fifth volatility range 820 may correspond to a top band (e.g., the top band 212 of FIG. 2), corresponding to VXN values of 34 or above.

In a particular embodiment, the plurality of volatility ranges 808 may be periodically updated. For example, at a certain time (e.g. annually), the first volatility range 812 (e.g., the bottom band 204 of FIG. 2) may be updated to correspond to VXN values of 16 or below, rather than 17 or below. Similar updates may be periodically made to each of the plurality of volatility ranges 808. In one embodiment, the plurality of volatility ranges 808 is updated based on historical data associated with the volatility index value 826, historical data associated with one or more financial securities exchanges, a predictive statistical model associated with one or more financial securities exchanges, computer trading simulations, or any combination thereof.

In a particular embodiment, the volatility index value 826 includes a VXN value of 17 or below. In this case, the volatility index value 826 falls within the first volatility range 812. As a result, a rule to overlay 25% of the portfolio with sold call options may be selected. Based on the particular volatility range identified (e.g., the first volatility range 812), the processor 806 is configured to generate at least one proposed financial market transaction 822 based on the particular percentage (e.g., 25%). The proposed financial market transaction 822 (e.g., place an order to sell call options associated with 25% of the equity portion of a portfolio) may be transmitted to a brokerage account 824 for processing.

In another particular embodiment, the volatility index value 826 includes a VXN value that is greater than 17 and less than 18. In this case, the volatility index value 826 falls within the second volatility range 814. As a result, a rule to overlay a proportionate amount between 25 and 50% of the portfolio may be selected. To illustrate, if the volatility index value 826 is a VXN value of 17.5, an overlay of 37.5% may be used. In another particular embodiment, the volatility index value 826 includes a VXN value that is greater than or equal to 18 and less than 33. In this case, the volatility index value 826 falls within the third volatility range 816. As a result, a rule to overlay 50% of the portfolio may be selected. In another particular embodiment, the volatility index value 826 includes a VXN value greater than or equal to 33 and less than 34. In this case, the volatility index value 826 falls within the fourth volatility range 818. As a result, a rule to overlay a proportionate amount between 50 and 90% of the portfolio may be selected. To illustrate, if the volatility index value 826 is a VXN value of 33.1, an overlay of 54% may be used. In another particular embodiment, the volatility index value 826 includes a VXN value of 34 or above. In this case, the volatility index value 826 falls within the fifth volatility range 820. As a result, a rule to overlay 90% of the portfolio may be selected. It should be noted that the percentages listed are merely illustrative. Further, the overlay percentages may be adjusted on an ongoing basis (e.g., monthly or yearly, among other alternatives).

In a particular embodiment, the memory device 804 is further configured to store data representing the equity portion of the portfolio of securities and data representing an income portion of the portfolio of securities, and the processor 806 is further configured to update the data representing the equity portion and the income portion after completion of the at least one proposed financial market transaction 822.

In another particular embodiment, the system of FIG. 8 includes a brokerage account interface coupled to the processor 806 and configured to transmit orders associated with the at least one proposed financial market transaction 822 to a financial institution and to receive an indication from the financial institution that the transmitted orders have been filled, have expired, or any combination thereof.

Figure 9:
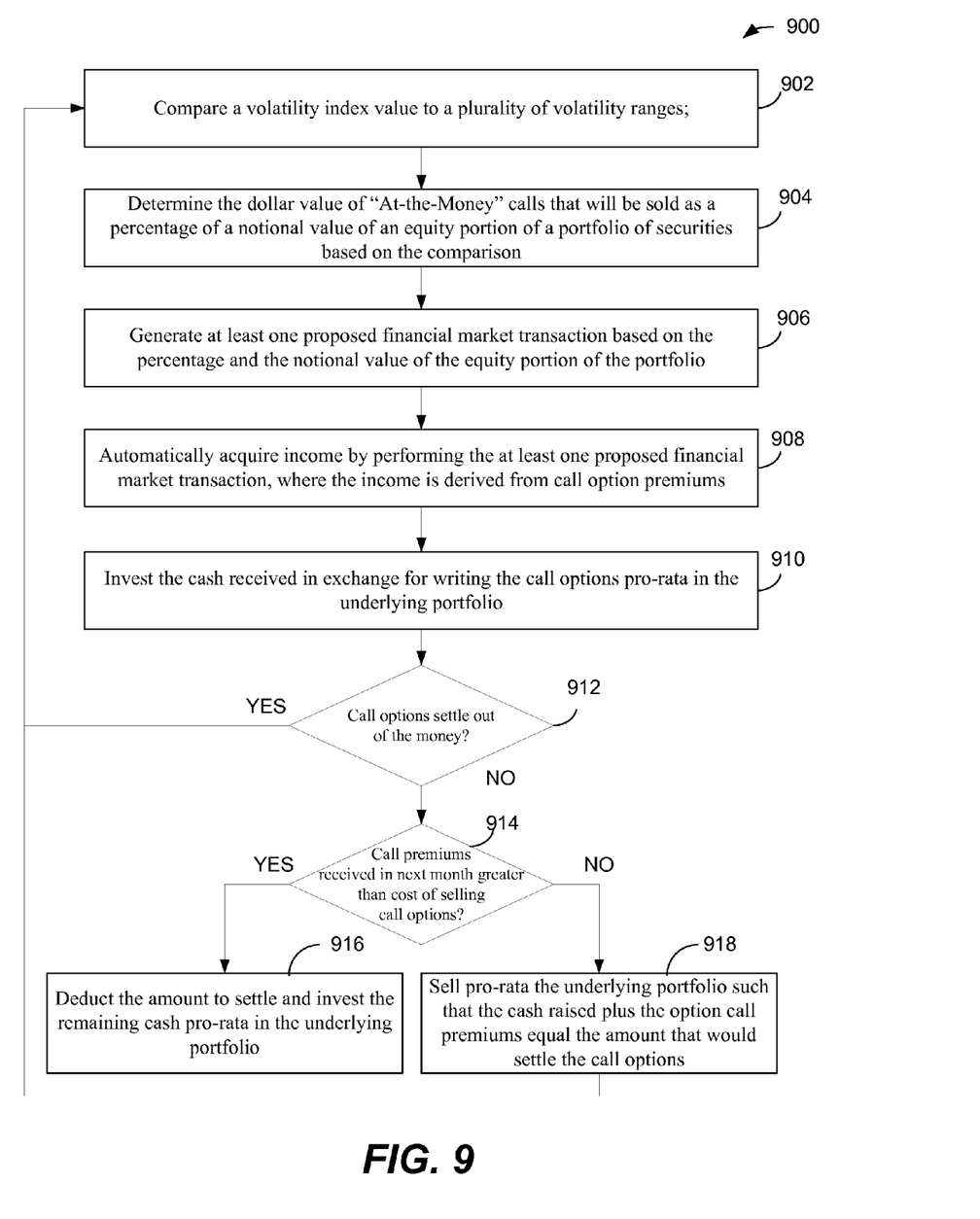
FIG. 9 is a flow diagram to illustrate a particular embodiment of a method of executing a volatility-based option strategy, such as the active overlay strategy.

Referring to FIG. 9, a computer-implemented method of rules-based risk management is illustrated, at 900. The method may enable active risk management by determining an appropriate level of call options based on a volatility index in order to receive call option premiums to provide a downside cushion to a portfolio in a relatively volatile market (e.g., a down market).

The method includes comparing a volatility index value to a plurality of volatility ranges, at 902. For example, the volatility index value 826 of FIG. 8 may be compared to the plurality of volatility ranges 808. Each of the plurality of volatility ranges is contiguous and non-overlapping. In one embodiment, the plurality of volatility ranges includes a first range associated with a low value of the volatility index value, a second range associated with a medium-low value of the volatility index value, a third range associated with a medium value of the volatility index value, a fourth range associated with a medium-high value of the volatility index value, and a fifth range associated with a high value of the volatility index value.

The method includes determining a percentage of a notional value of an equity portion of a portfolio of securities based on the comparison, at 904. For example, the volatility index value 826 of FIG. 8 may include a VXN value greater than 17 but less than 18. In this case, the volatility index value 826 falls within the second volatility range 814. As a result, a rule to overlay a proportionate amount between 25 and 50% of the portfolio may be selected. To illustrate, if the volatility index value 826 is a VXN value of 17.5, an overlay of 37.5% may be used. In a particular embodiment, the portfolio of securities is associated with a ticker symbol that is individually tradable at a financial securities exchange. In another embodiment, the portfolio of securities includes an exchange traded fund (ETF) or a tracking security (e.g., the SPDR S&P tracking security, SPY). In another embodiment, the portfolio of securities includes a closed end fund or a mutual fund.

The method includes generating at least one proposed financial market transaction based on the percentage and based on a value of the equity portion of the portfolio, at 906. For example, in FIG. 8, based on a volatility index value 826 of 17.5, the at least one proposed financial market transaction may include initiating a call option sale with respect to 37.5% of the equity portion of a portfolio.

The method includes automatically acquiring income by performing at least one proposed financial market transaction, where the income is derived from call option premiums, at 908. For example, in FIG. 8, the brokerage account 824 may be used to automatically acquire income by performing the proposed financial market transaction 822.

In the particular embodiment illustrated in FIG. 9, the method includes investing the cash received in exchange for writing the call options pro-rata in the underlying portfolio, at 910. In the subsequent month, the method includes determining whether the call options settled out of the money, at 912. When the call options settle out of the money (e.g., the call options are worthless), the method includes repeating steps 902 to 910. When the call options settle in the money, the method includes determining whether the call premiums received in the next month are greater than the cost of settling the call options, at 914. If the call premiums received in the next month are greater than the cost of settling the call options, the method includes deducting the amount to settle and investing the remaining cash pro-rata in the underlying portfolio, at 916. If the call premiums received in the next month are less than the cost of settling the call options, the method includes selling pro-rata the underlying portfolio such that the cash raised from these sales plus the option call premiums received equal the amount that would settle the call options, at 918.

Figure 10:
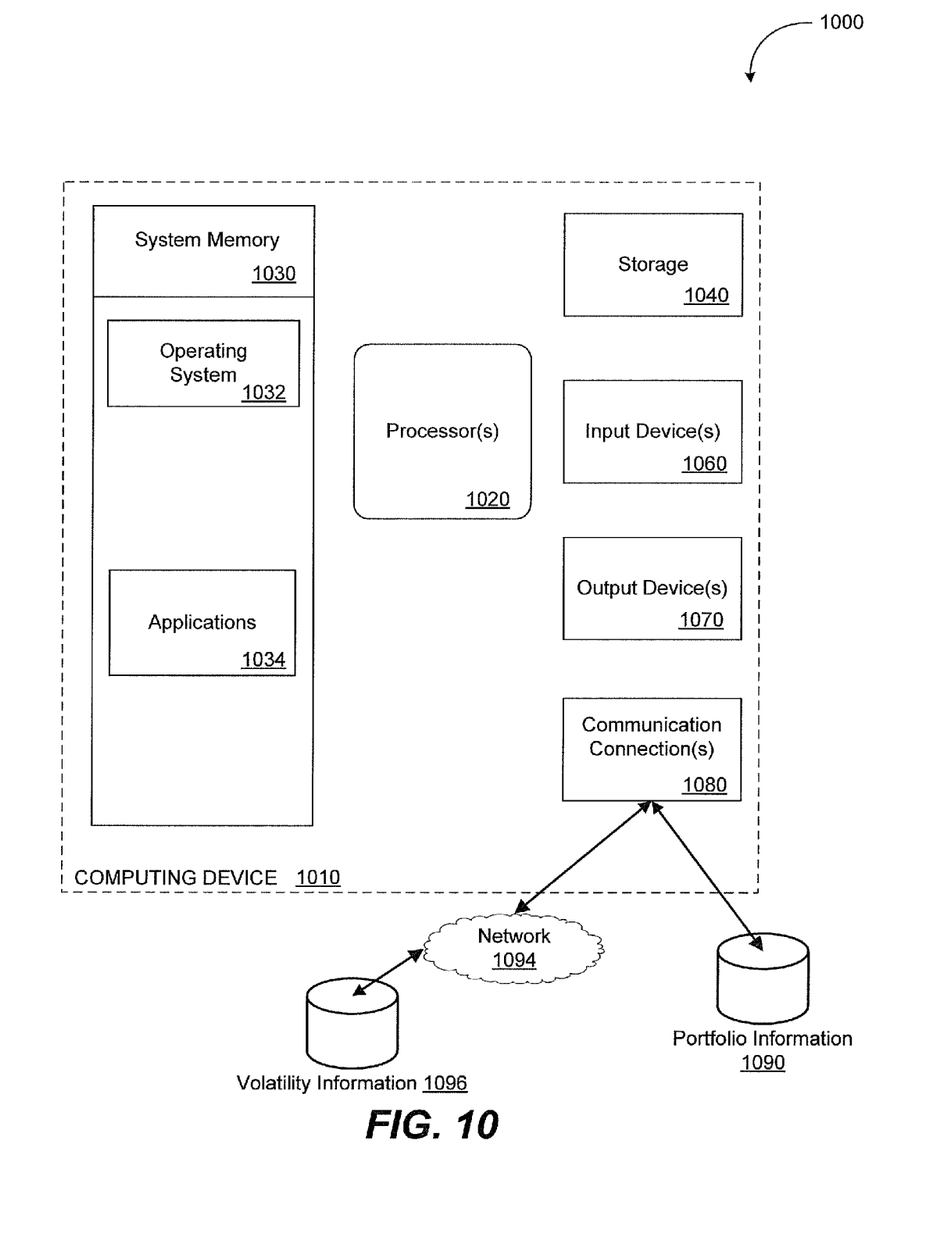
FIG. 10 is a block diagram of a computing environment including a computing device operable to support embodiments of computer-implemented methods, computer program products, and system components to implement the strategies, methods, and rules as illustrated in FIGS. 1-9.

FIG. 10 shows a block diagram of a computing environment 1000 including a representative computing device 1010 operable to support embodiments of computer-implemented methods, computer program products, and system components to implement the strategies, methods, and rules as illustrated in FIGS. 1-10. In an illustrative embodiment, the computing device 1010 may implement one or more of the components of the system 800 of FIG. 8.

The computing device 1010 includes at least one processor 1020 and a system memory 1030. Depending on the configuration and type of computing device, the system memory 1030 may be volatile (such as random access memory or "RAM"), non-volatile (such as read-only memory or "ROM," and similar memory devices that maintain stored data even when power is not provided) or some combination of the two. The system memory 1030 typically includes an operating system 1032 and one or more applications 1034. Alternatively, the applications 1034 may be located at multiple computing devices, where the multiple computing devices are part of a distributed computing system. In this case, one or more of the multiple computing devices of the distributed system may comprise the representative computing device 1010.

The computing device 1010 may also have additional features or functionality. For example, the computing device 1010 may also include removable and/or non-removable data storage devices such as magnetic disks, optical disks, tape, and memory cards. Such additional storage is illustrated in FIG. 10 by storage 1040. Computer storage media may include volatile and/or non-volatile storage and removable and/or non-removable media implemented in any method or technology for storage of information such as computer-readable instructions, data structures, program components or other data. The system memory 1030 and the storage 1040 are examples of computer storage media. The computer storage media includes, but is not limited to, RAM, ROM, electrically erasable programmable read-only memory (EEPROM), or other memory technology, compact disks (CD), digital versatile disks (DVD) or other optical storage, magnetic cassettes, magnetic tape, magnetic disk storage or other magnetic storage devices, or any other medium that can be used to store information and that can be accessed by computing device 1010. Any such computer storage media may be part of the computing device 1010. The computing device 1010 may also have input device(s) 1060, such as a keyboard, mouse, pen, voice input device, touch input device, etc. Output device(s) 1070, such as a display, speakers, a printer, etc. may also be included.

The computing device 1010 also contains one or more communication connections 1080 that allow the computing device 1010 to communicate with a database of portfolio information 1090 and a database of volatility information 1096 via a wired or a wireless network 1094. In an illustrative embodiment, the database of volatility information 1096 may be associated with the volatility information database 810 of FIG. 8, and the database of portfolio information 1090 may be associated with the brokerage account 824 of FIG. 8.

The communication connections 1080 are an example of communication media. By way of example, and not limitation, communication media may include wired media such as a wired network or direct-wired connection, and wireless media, such as acoustic, radio frequency (RF), infrared and other wireless media. It will be appreciated that not all of the components or devices illustrated in FIG. 10 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope possible consistent with the principles and novel features as defined by the following claims, and their equivalents.

What is claimed is:

1. A computer-implemented method comprising:
receiving, at a computing device, an implied volatility index value indicating a value associated with a volatility index at a particular time;
comparing, at the computing device, the implied volatility index value to a plurality of implied volatility ranges, wherein the plurality of implied volatility ranges includes a first range of implied volatility index values that are less than a first threshold, a second range of implied volatility index values that are greater than or equal to the first threshold and less than a second threshold, and a third range of implied volatility index values that are greater than or equal to the second threshold;
determining, at the computing device, a particular implied volatility range that includes the implied volatility index value based on the comparison;
determining, at the computing device, a percentage of a notional value of an equity portion of a portfolio of securities, the percentage of the notional value corresponding to the particular implied volatility range;
generating, at the computing device, at least one proposed financial market transaction based on the percentage of the notional value of the equity portion of the portfolio; and
automatically acquiring income by performing, at the computing device, the at least one proposed financial market transaction, wherein the income is derived from option premiums.

2. The computer-implemented method of claim 1, wherein the portfolio of securities is associated with a ticker symbol that is individually tradable at a financial securities exchange.

3. The computer-implemented method of claim 2, wherein the portfolio of securities includes an exchange traded fund (ETF) and a tracking security.

4. The computer-implemented method of claim 1, wherein the portfolio of securities includes at least one of a closed end fund and a mutual fund.

5. The computer-implemented method of claim 1, wherein each of the plurality of implied volatility ranges is contiguous and non-overlapping.

6. The computer-implemented method of claim 1, wherein each value in the first range of implied volatility index values is greater than a third threshold, wherein each value in the third range of implied volatility index values is less than a fourth threshold, and wherein the plurality of implied volatility ranges further includes a fourth range of implied volatility index values that are less than or equal to the third threshold and a fifth range of implied volatility index values that are greater than or equal to the fourth threshold.

7. The computer-implemented method of claim 6, wherein the volatility index value is associated with one of a Chicago Board Options Exchange (CBOE) Nasdaq-100 Volatility Index (VXN) and a CBOE S&P 500 Volatility Index (VIX), and wherein:
the third threshold is 17;
the first threshold is 18;
the second threshold is 33; and
the fourth threshold is 34.

8. The computer-implemented method of claim 6, wherein:
when the implied volatility index value is in the fourth range, the percentage is 25 percent;
when the implied volatility index value is in the first range, the percentage is a value between 25 percent and 50 percent;
when the implied volatility index value is in the second range, the percentage is 50 percent;
when the implied volatility index value is in the third range, the percentage is a value between 50 percent and 90 percent; and
when the implied volatility index value is in the fifth range, the percentage is 90 percent.

9. The computer-implemented method of claim 1, wherein the computer-implemented method is performed periodically.

10. The computer-implemented method of claim 1, further comprising purchasing securities into the equity portion of the portfolio.

11. The computer-implemented method of claim 1, further comprising:
determining that the percentage is zero percent with respect to a particular period of time; and
not generating proposed financial transactions for the particular period of time.

12. The computer-implemented method of claim 1, wherein the at least one proposed financial market transaction includes a covered call option associated with a security included in the equity portion of the portfolio.

13. The computer-implemented method of claim 1, further comprising updating the plurality of implied volatility ranges.

14. The computer-implemented method of claim 13, wherein the plurality of implied volatility ranges is updated based on historical data associated with the implied volatility index value, historical data associated with one or more financial securities exchanges, a predictive statistical model associated with one or more financial securities exchanges, computer trading simulations, or any combination thereof.

15. A system, comprising:
an interface configured to receive an implied volatility index value indicating a value associated with a volatility index at a particular time;
a memory device configured to store a plurality of implied volatility ranges, wherein the plurality of implied volatility ranges includes a first range of implied volatility index values that are less than a first threshold, a second range of implied volatility index values that are greater than or equal to the first threshold and less than a second threshold, a third range of implied volatility index values that are greater than or equal to the second range, and wherein each implied volatility range is associated with a percentage of a notional value of an equity portion of a portfolio of securities; and
a processor coupled to the memory device, the processor configured to:
identify a particular implied volatility range of the plurality of implied volatility ranges that includes the implied volatility index value;
identify a particular percentage of the notional value associated with the particular implied volatility range, wherein the particular percentage is less than 100 percent;

automatically generate at least one proposed financial market transaction based on the particular percentage.

16. The system of claim 15, further comprising automatically acquiring income from executing the at least one proposed financial market transaction, wherein the income is derived from call option premiums.

17. The system of claim 15, wherein the memory device is further configured to store data representing the equity portion of the portfolio of securities and an income portion of the portfolio of securities and wherein the processor is further configured to update the data representing the equity portion and the income portion after completion of the at least one proposed financial market transaction.

18. The system of claim 15, further comprising a brokerage account interface configured to transmit orders associated with the at least one proposed financial market transaction to a financial institution and to receive an indication from the financial institution that the transmitted orders have been filled, have expired, or any combination thereof.

19. A non-transitory computer-readable storage medium comprising instructions, that when executed by a computer, cause the computer to:
receive an implied volatility index value indicating a value associated with a volatility index at a particular time;
compare the implied volatility index value to a plurality of implied volatility ranges, wherein the plurality of implied volatility ranges includes a first range of implied volatility index values that are less than a first threshold, a second range of implied volatility index values that are greater than or equal to the first threshold and less than a second threshold, and a third range of implied volatility index values that are greater than or equal to the second threshold;
determine a particular implied volatility range that includes the implied volatility index value based on the comparisons;
determine a percentage of a notional value of an equity portion of a portfolio of securities, the percentage of the notional value corresponding to the particular implied volatility range;
generate at least one proposed financial market transaction based on the percentage of the notional value of the equity portion of the portfolio; and
automatically acquiring income by performing the at least one proposed financial market transaction, wherein the income is derived from option premiums.

20. The non-transitory computer-readable medium of claim 19, wherein the at least one proposed financial market transaction comprises an order to sell call options, wherein the call options are associated with one or more of a Standard & Poor's Depositary Receipts (SPDR), a midcap stock index, a small cap stock index, or any other index upon which call options can be written.

21. The computer-implemented method of claim 1, further comprising automatically generating, at the computing device, an active buy-write index based on market performance of a portfolio of equities associated with a market index and based on a particular allotment of call options, wherein the particular allotment of call options is determined based on the implied volatility index value.

22. The computer-implemented method of claim 21, wherein the market index includes the Nasdaq-100 (N-100) index, the implied volatility index value is associated with a Chicago Board Options Exchange (CBOE) N-100 volatility index, and the particular allotment of call options is less than 100 percent of a notional value of the portfolio of equities.

23. The computer-implemented method of claim 21, wherein the market index includes the Standard and Poor's (S&P) 500 index, the data implied volatility index value is associated with a Chicago Board Options Exchange (CBOE) S&P 500 volatility index, and the particular allotment of call options is less than 100 percent of a notional value of the portfolio of equities.

* * * * *